United States Patent [19]

Kawahara et al.

[11] Patent Number: 4,614,977
[45] Date of Patent: Sep. 30, 1986

[54] STILL PICTURE SIGNAL CONVERSION APPARATUS CAPABLE OF TRIMMING OPERATION

[75] Inventors: Atsushi Kawahara, Kawasaki; Tadashi Ota, Tokyo; Toshihisa Kuroiwa, Kawasaki; Masaki Isogai, Tokyo; Norihiko Takatsu, Kawasaki; Koichiro Kawamura, Chiba, all of Japan

[73] Assignee: Nippon Kogaku K.K., Tokyo, Japan

[21] Appl. No.: 451,604

[22] Filed: Dec. 20, 1982

[30] Foreign Application Priority Data

Dec. 23, 1981 [JP] Japan ................. 56-207134

[51] Int. Cl.⁴ ........................................... H04M 1/40
[52] U.S. Cl. .................................. 358/260; 358/280; 358/287
[58] Field of Search ............... 358/133, 287, 260, 280, 358/138

[56] References Cited

U.S. PATENT DOCUMENTS

4,402,016 8/1983 Muller ............................. 358/287
4,468,755 8/1984 Iida ................................. 358/287

Primary Examiner—James J. Groody
Assistant Examiner—Edward L. Coles
Attorney, Agent, or Firm—Michael N. Meller

[57] ABSTRACT

A still picture signal conversion apparatus converts a still picture signal reproduced in the form of an electric signal from a video tape or disk, still picture video camera or the like to a low-velocity narrow-band signal suited for use in a facsimile system utilizing the ordinary telephone circuit or a hard copying apparatus and performs the desired trimming operation on the signal when delivering the same. A selected portion of each horizontal scan line is taken out as a sampled digital picture signal and the number of the horizontal picture elements is compensated for by the method of sampling frequency adjustment or weighted interpolation. To effect the vertical trimming, the digital picture signal is stored temporarily every horizontal scan line in a plurality of memories so that portion of the signal to be retained by the trimming is selectively read out and the deficient number of scan lines is compensated for by the method of weighted interpolation.

12 Claims, 11 Drawing Figures

| INTER-POLATION PICTURE ELEMENT Sj | a | REPRODUCING RATIO ||||| 
|---|---|---|---|---|---|---|
| | | 4/8 | 5/8 | 6/8 | 7/8 | 8/8 |
| $S_0$ | $a_1$ | 0 | 0 | 0 | 0 | 0 |
| | $a_2$ | 8 | 8 | 8 | 8 | 8 |
| $S_1$ | $a_1$ | 4 | 3 | 2 | 1 | 0 |
| | $a_2$ | 4 | 5 | 6 | 7 | 8 |
| $S_2$ | $a_1$ | 0 | 6 | 4 | 2 | 0 |
| | $a_2$ | 8 | 2 | 4 | 6 | 8 |
| $S_3$ | $a_1$ | 4 | 1 | 6 | 3 | 0 |
| | $a_2$ | 4 | 7 | 2 | 5 | 8 |
| $S_4$ | $a_1$ | 0 | 4 | 0 | 4 | 0 |
| | $a_2$ | 8 | 4 | 8 | 4 | 8 |
| $S_5$ | $a_1$ | 4 | 7 | 2 | 5 | 0 |
| | $a_2$ | 4 | 1 | 6 | 3 | 8 |
| $S_6$ | $a_1$ | 0 | 2 | 4 | 6 | 0 |
| | $a_2$ | 8 | 6 | 4 | 2 | 8 |
| $S_7$ | $a_1$ | 4 | 5 | 6 | 7 | 0 |
| | $a_2$ | 4 | 3 | 2 | 1 | 8 |

TIME →

FIG. 11

STILL PICTURE SIGNAL CONVERSION APPARATUS CAPABLE OF TRIMMING OPERATION

BACKGROUND OF THE INVENTION

The present invention relates to a still picture signal conversion apparatus and more particularly to a still picture signal conversion apparatus so designed that a still picture signal reproduced in the form of an electric signal from a video tape or disk or a still picture video camera is converted and delivered as a low-velocity narrow-band signal suitable for use in a facsimile system utilizing the public telephone circuit, a hard copying equipment or the like and the signal is delivered after performing the desired trimming thereon.

With the conventional press picture facsimile system, it has been the usual practice that after developing a film exposed by a silver salt still camera and trimming the film as needed the film is printed, wound on the rotary drum of the facsimile transmitter and scanned mechanically and the picture signal resulting from the photoelectric conversion is amplitude-modulated, thereby transmitting the picture signal over the public telephone circuit. In this case, the print is usually in the form of a positive picture subjected to the necessary trimming and having a cabinet size (120 mm×165 mm) or octavo size (165 mm×216 mm) which is about two times the former. With this type of known press picture facsimile system, the operations of developing, trimming and printing constitute one of the serious disadvantages of the press picture facsimile transmission which cannot afford the loss of time and there has been the need to reduce the time required.

SUMMARY OF THE INVENTION

The present invention has been made to meet the foregoing requirement and it is the primary object of the invention to provide a still picture signal conversion apparatus which, presupposing the use of an area imaging and recording device capable of taking out a photographed picture as an electric signal without the need to perform the operations of development and printing, is capable of meeting the requirements for the reproduction, trimming, facsimile transmission and conversion into a hard copy of the photographed picture through entirely electronic operations, that is, an interface apparatus capable of performing the desired trimming operation between the area imaging and recording device or its reproducing device and the facsimile system or the hard copying system.

In accordance with the invention there is thus provided a still picture signal conversion apparatus which receives a reproduced still picture signal from a video tape recorder, video disk reproducing apparatus or a magnetic disk for magnetically recording the still picture taken by a video camera and it comprises, as a basic construction, a horizontal trimming circuit for sampling a still picture signal with respect to all the scanning lines, converting the sampled picture signal, within the limits of horizontal scanning positions to be retained by trimming, to a digitized video signal corresponding to a predetermined number of horizontal picture elements and generating the same every horizontal scanning line; and a vertical trimming circuit for temporarily storing the digitized picture signal generated every horizontal scanning line from the horizontal trimming circuit in a plurality of memory means and simultaneously reading at a desired rate the picture signal corresponding to the memory contents within the limits of vertical positions to be retained by trimming and interpolating the deficiency of the horizontal scanning lines within the range of vertical positions with respect to a predetermined number of scanning lines in accordance with the weighted scanning line interpolation calculation corresponding to the ratio of trimming.

In accordance with one embodiment of the invention, the horizontal trimming circuit comprises variable sampling frequency sampling means for sampling and digitizing a reproduced still picture signal every horizontal scanning line, and horizontal trimming control means for varying the positions of the sampling starting and terminating points of the sampling means in accordance with the limits of horizontal scanning positions to be retained by trimming and varying the sampling frequency so as to set the number of sampling points during the interval between the starting and terminating points to a predetermined number.

In this case, preferably the sampling means comprises at its input a delay circuit for expanding the still picture signal in time and converting the same to a low-velocity narrow-band picture signal.

In accordance with another embodiment, the horizontal trimming circuit is designed to perform the completely digital signal processing and thus the horizontal trimming circuit comprises sampling means for sampling a still picture signal every horizontal scan line and generating the same as digital data for a given number of sampling points, a memory device for storing the digital data for one horizontal scan line, horizontal interpolation means capable of performing the operation of weighted interpolation and comprising cascade-connected latch circuits for reading the digital data of the desired sampling points from the memory device in accordance with the horizontal scan positions to be trimmed and setting the number of sampling points during the interval to a predetermined number, and horizontal trimming control means for controlling these operations.

The vertical trimming circuit comprises a plurality of memory circuits for temporarily storing the digitized picture signal for one horizontal scan line from the horizontal trimming circuit, data selection means for reading simultaneously the stored content picture signal from two of the memory circuits at the desired rate and varying the starting and terminating points of the reading in accordance with the vertical positions to be trimmed, vertical interpolation means for interpolating the deficit of the horizontal scan lines within the limits of vertical positions by the calculation of weighted scan line interpolation in accordance with the ratio of trimming and increasing the same to a predetermined number of scanning lines, and vertical trimming control means for controlling the operation of these means.

Thus, the present invention is capable of superimposing cursors indicative of the position and size of trimming on the reproduced picture displayed on a monitor CRT, extracting the desired partial signal from the reproduced still picture signal in accordance with the position and size data, interpolating the data with respect to the horizontal and vertical directions, obtaining the same numbers of scanning lines and horizontal picture elements as the original reproduced still picture signal and converting the same to a low-velocity narrow-band video signal suitable for facsimile transmission.

In accordance with the invention, for example, a high-velocity reproduced signal of a still picture signal picked up and recorded in a wide band by a camera tube, CCD solid-state area imaging device or the like can be subjected to the desired trimming operation while monitoring the same on the CRT screen of a monitoring apparatus, thereby supplying the same for facsimile transmission over the low-velocity narrow-band telephone circuit or to a hard copying system. Particularly, the invention can be used in the press picture facsimile system to reduce the size and weight of photographing video cameras and ensure rapid facsimile processing.

While, in the description to follow, a still picture video camera and a magnetic sheet reproducing device are shown by way of example as an area imaging and recording system and a reproducing system, respectively, and the application is shown as a facsimile system over the telephone circuit, the still picture signal conversion apparatus of this invention is not intended to be limited thereto and the apparatus can be used to receive as its input the various still picture signals including the reproduced signal from a floppy disk, the signal from a video tape recorder, the signals from various video disks, the signal from a video camera, etc., and supply its output to various systems such as a telephoto system and a hard copying machine.

The above and other objects as well as advantageous features of the invention will become more clear from the following description taken in conjunction with the attached drawings.

DESCRIPTION OF THE PREFERRED EMBODIMENTS

Figure 1:
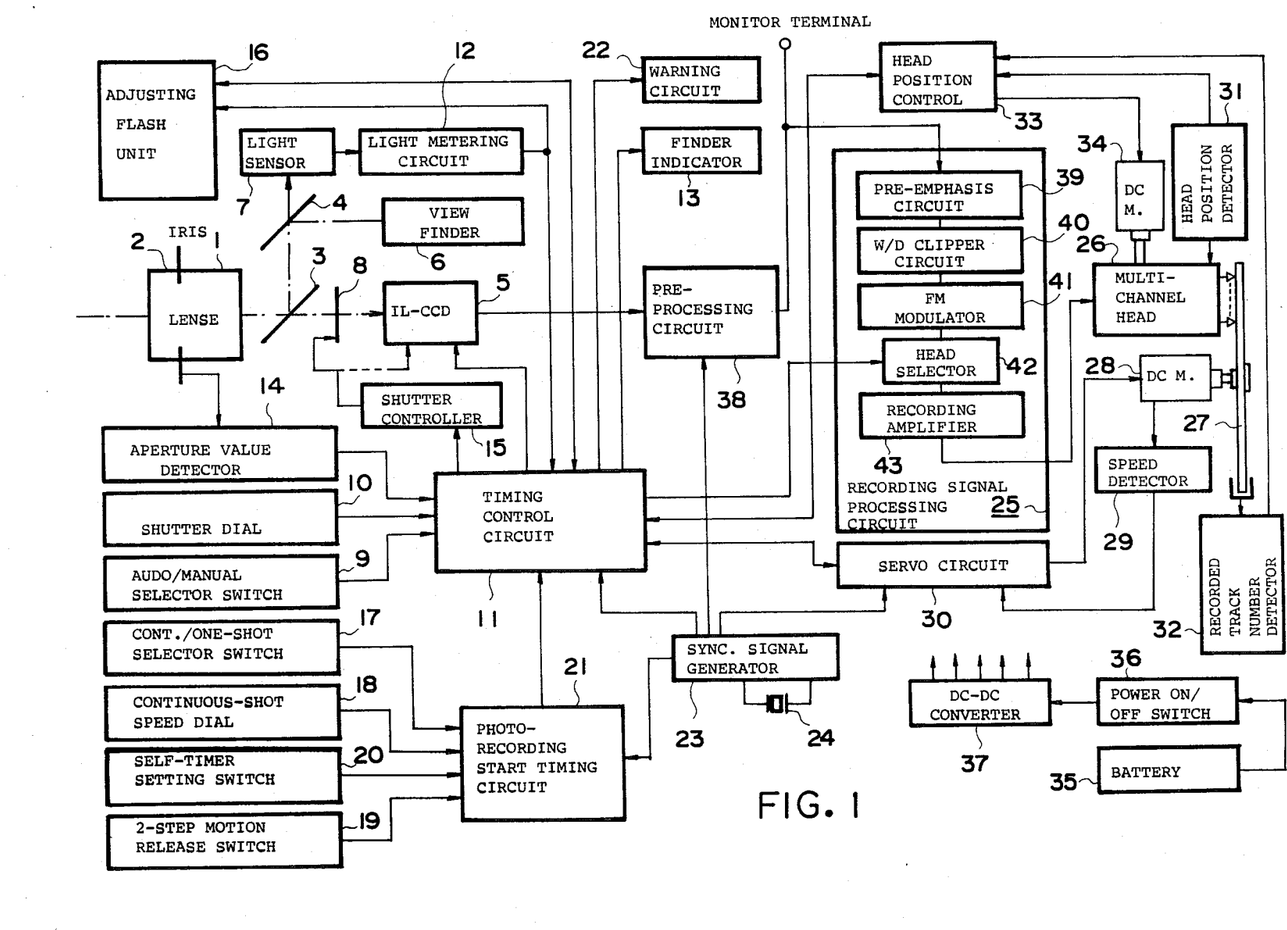
FIG. 1 is a block diagram showing an exemplary construction of an electronic video camera.

FIG. 1 is a block diagram showing by way of example the construction of a still picture video camera, particularly a press electronic camera as an excellent example of the camera for producing a still picture signal which is used in a still picture signal conversion apparatus according to the invention, and the camera will now be described.

In FIG. 1, numeral 1 designates a camera lens with an iris 2, and 3 and 4 are half-mirrors. The optical path from the lens 1 is divided into a solid-state area imaging device 5, a view finder 6 and a light sensor 7. Where the area imaging device 5 has no electrical shutter function, a mechanical shutter 8 is arranged between the half-mirror 3 and the area imaging device 5 as needed. Of course, if the mechanical shutter 8 is provided, the half-mirror 3 may be replaced with a mirror which performs a quick return operation in association with the operation of the shutter 8 through a quick return mirror mechanism. Numeral 9 designates a change-over circuit for switching the mode of exposure between the automatic and manual modes of operation, and in the manual mode of operation the iris 2 and a shutter speed setting dial 10 are suitably set before taking a picture. Numeral 11 designates a timing control circuit for performing the shutter speed control and the timing control of various other parts and in the manual mode of operation, whether the exposure by the set shutter speed is optimum is determined in accordance with the result of the light measurement effected by the light sensor 7 and determined by a light metering circuit 12 and the set shutter speed data from the shutter dial 10. Thus, if the exposure is not optimum, the timing control circuit 11 operates so that a finder indicator circuit 13 is caused to give an indication to that effect. On the other hand, while there are a variety of automatic operations, such as, the shutter speed priority and the programed AE, the operation in the automatic mode will be described by assuming that the camera is of the lens aperture priority type. More specifically, if the iris 2 of the lens 1 is set to give the proper depth of field, the aperture value is detected by an aperture value detecting circuit 14 and applied to the control circuit 11. Also the exposure corresponding to the set aperture value is applied to the control circuit 11 from the light metering circuit 12 so that if the shutter is the mechanical shutter 8 and the quick return operation of the mirror is effected, the output of the light metering circuit 12 is stored temporarily and the shutter time is determined in accordance with the stored output. Also, in the case of the system in which the quick return operation is not effected due to the combination of the mechanical shutter 8 and the half-mirror 3 and thus the light is continuously applied to the light sensor 7, the output of the light metering circuit 12 is integrated over a period of time so that when the optimum exposure for the area imaging device 5 is reached, a shutter control circuit 15 is operated and the shutter 8 is closed. If the exposure is insufficient, an adjusting flash unit 16 is used as an auxiliary light source and in this case it is advantageous to employ an adjusting strobe system in which the light intensity is continuously measured by the light sensor 7 through the half-mirror 3 and the flash unit 16 is caused to generate its light output until the proper exposure is attained, at which time the flash unit output is stopped. The camera body of FIG. 1 incorporates other camera functions, one of which is the continuous-shot function. More specifically, the continuous-shot mode can be selected by a continuous-shot/one-shot selector switch 17 and in this case a continuous-shot speed setting dial 18 is used to set the continuous-shot speed before taking pictures. In either the continuous-shot or the one-shot operations, the operation is started by a release switch 19 and the release switch 19 is of the two-step motion type, for example, which actuates the light metering circuit system by the first step and initiates the photographing by the second step. The continuous-shot operation is continued as long as the second step is depressed and the operation is stopped upon returning to the first step. Also, the depression of the first step can be utilized for starting the recording device which will be described later. Numeral 20 designates a self-timer time setting selector switch for selectively setting a plurality of timer times.

These preset values for the continuous shooting, the self-timer, etc., are supplied in digital form to a photographing/recording start timing circuit 21, which in turn generates a photographing start signal to actuate the control circuit 11. A warning circuit 22 includes a buzzer or a warning light comprising a light-emitting diode and it is responsive to the signals from the control circuit 11 to give warning against various operations. These operations are controlled by the synchronizing signals generated by a synchronizing signal generating circuit 23 in accordance with the reference clock frequency of a crystal oscillator 24 and thus all the operations, including from the photographing to the recording, are effected in synchronization within the camera body.

The area imaging device 5 used in the camera of FIG. 1 must include at least as many picture elements as 600 (vertical elements) × 900 (horizontal elements). In other words, these picture elements are sufficient for ensuring a degree of picture quality which fully meets the practical requirements for printing out the picture as a cabinet photography used for press picture facsimile transmission. Where the mechanical shutter 8 is not used and the shutter function is electrically incorporated in the device itself, the area imaging device 5 should preferably be of the interline transfer CCD type and the frame transfer CCD type has some difficulties in view of the need to realize a high-speed shutter. Other devices of the X-Y address type such as MOS-type devices are not suitable for the purpose. Where the mechanical shutter 8 is used, any of these types can be used and from the standpoint of ensuring a large number of picture elements it is considered practically preferable to use an area imaging device of the frame transfer CCD type, excluding the storage section since this type is simple in electrode construction and usable in combination with a mechanical shutter, making it possible to dispense with its storage section.

Referring to the recording apparatus of FIG. 1, the output of the area imaging device 5 is applied to a preprocessing circuit 38 comprising a preamplifier, a process amplifier, etc., so that the output is subjected to dark current correction in accordance with the reference output from a black reference light sensor which is screened from the light and provided at the horizontal scan line end of the light sensing section, is combined with the synchronizing signals and then applied to a recording signal processing circuit 25. The recording signal processing circuit 25 comprises a pre-emphasis circuit 39, a white/dark clipper circuit 40, an FM modulator circuit 41, a head changeover circuit 42 and a recording amplifier 43 which are necessary for the magnetic recording of video signals, and its output is recorded on a magnetic sheet 27 by a magnetic head 26. In this case, the magnetic head 26 may be advantageously comprised of a multi-channel head so as to reduce the total length of the circumferential tracks and thereby reduce the sheet diameter of the magnetic sheet 27. In this way, the large picture of 600×900 picture elements is divided and recorded on a plurality of tracks of the magnetic sheet 27. Note that the switching of the head 26 is effected electrically during the horizontal blanking time and also the speed of the magnetic sheet recorder is determined in accordance with the number of divided picture portions and the relative speeds of the head and the sheet. The recorder speed is maintained constant by a motor 28 as well as a speed (phase) detecting circuit 29 and a servo circuit 30 which are operatively associated with the motor 28. In order that the head 26 may be moved successively from the edge of the sheet 27, the tracking of the head 26 is controlled through a stepping motor 34 by a head position control circuit 33, including a head position detecting circuit 31 and a number of recorded tracks detecting circuit 32. Numeral 35 designates a battery, 36 a power switch, and 37 a DC-DC converter and these elements form a camera power supply circuit.

After the completion of the photographing by the above-mentioned press electronic camera, the recorded magnetic sheet 27 is removed from the camera, fed to a reproducing apparatus which will be described later, reproduced, trimmed and transmitted over the telephone circuit and received and converted to a hard print by the ordinary facsimile transmission and reception system. In this case, the reproduced picture signal obtained by reproducing the picture signal recorded on the magnetic sheet 27 by the ordinary video playback system is a high-velocity wide-band signal since the storage time of the CCD solid-state area imaging device 5 is very short in consideration of the dark current. Thus, the conversion circuit of this invention has a principal function of performing the desired trimming on the reproduced picture signal and converting the high-velocity wide-band signal to a low-velocity narrow-band signal suitable for transmission over the telephone circuit or application to a hard copying apparatus.

Figure 2:
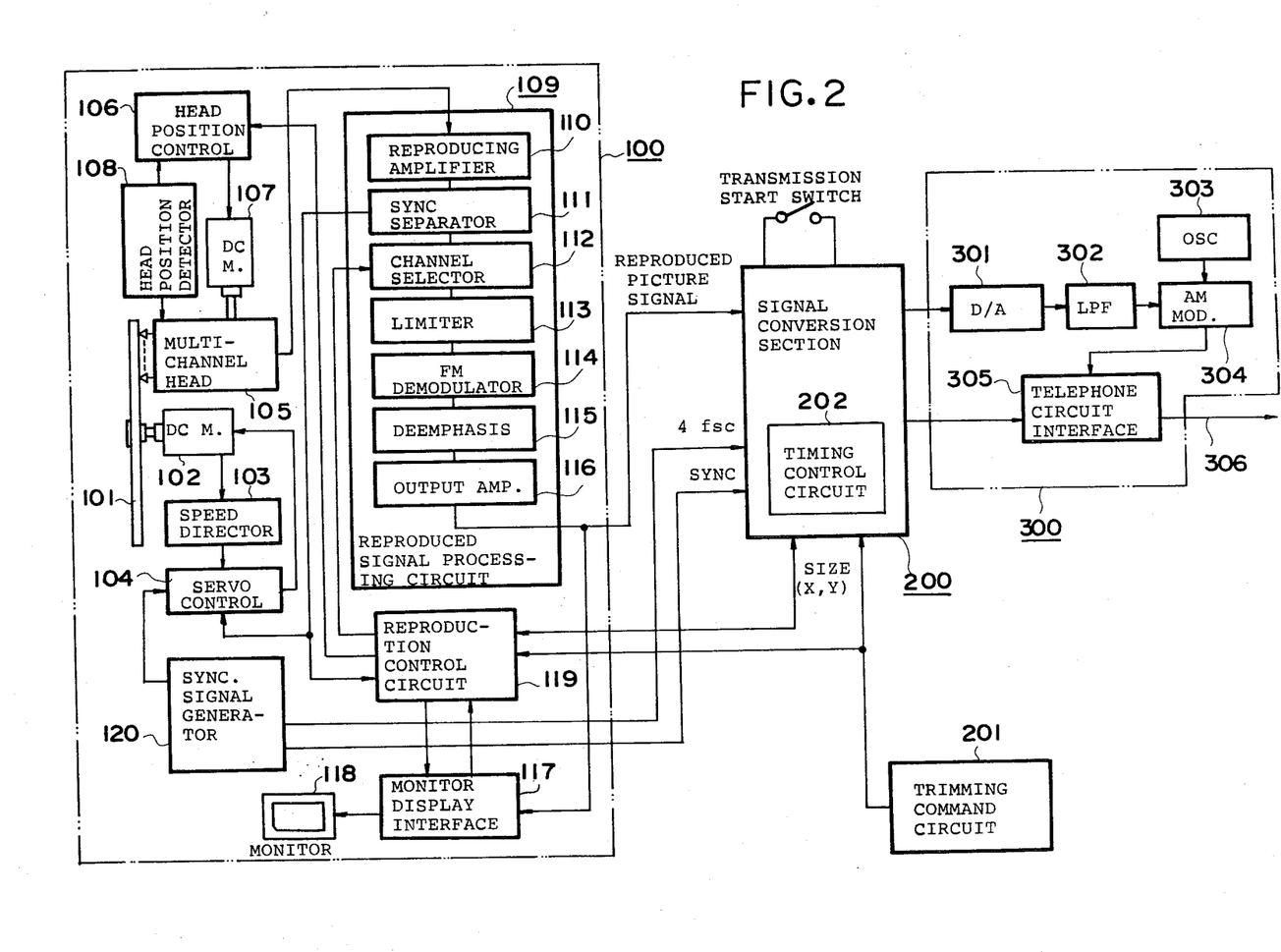
FIG. 2 is a block diagram showing an exemplary construction of a facsimile system incorporating a signal conversion apparatus according to the present invention.

FIG. 2 shows an exemplary case where the present invention is applied to a facsimile transmitter used in combination with the camera of FIG. 1 and the transmitter comprises mainly a reproducing section 100, a signal conversion section 200 according to the invention and a transmission output section 300 for outputting to the telephone circuit.

The reproducing section 100 is a reproducer for a magnetic sheet 101 which corresponds to the magnetic sheet 27 of FIG. 1 and its rotational speed is controlled by a speed control system comprising a DC motor 102, a speed (phase) detecting circuit 103 and a rotation servo control circuit 104 in such a manner that the synchronizing signals in the reproduced picture signal have a given frequency. In this case, the synchronizing signals are the ones separated by a sync separator circuit 111 from the reproduced picture signal from a reproducing amplifier 110 and the servo system is operated such that the frequency of the synchronizing signals always becomes equal to the frequency of a reference signal generated from a synchronizing signal generator 120.

A reproducing head 105 is of the multi-channel construction having the same number of channels as in the camera body and also a head position servo system comprises a head position control circuit 106, a DC motor 107 and a head position detecting circuit 108. In this case, it may be arranged so that a command is applied externally to the head position detecting circuit 108 to arbitrarily determine the head position and the servo system positions the head 105 on the desired track in accordance with the command.

Numeral 109 designates a reproduced signal processing circuit comprising a channel selector circuit 112, a limiter 113, an FM demodulator circuit 114, a de-emphasis circuit 115 and an output amplifier 116 in addition to the above-mentioned reproducing amplifier 110 and sync separator circuit 111.

The output of the reproduced signal processing circuit 109 is applied as such to an exclusive high-resolution monitor 118 through a monitor display interface circuit 117 and is displayed on the CRT screen.

Numeral 119 designates a reproduction control circuit responsive to the synchronizing signal applied from the sync separation circuit 111 to apply a signal to a facsimile timing control circuit 202 of the signal conversion section 200 so as to cause the timing control circuit 202 to respond to the synchronizing signals from the sync separation circuit 111. A trimming command circuit 201 is connected to the interface circuit 117 through the reproduction control circuit 119 and the trimming command circuit 201 allows the interface circuit 117 to superpose the electronically generated cursors on the picture on the monitor 118 and move the cursors so as to indicate the horizontal and vertical coordinates on the monitor 118. The trimming coordinate data comprises 10 horizontal bits and 9 vertical bits and are applied, along with a 3-bit trimming size data, to the signal conversion section 200 through the reproduction control circuit 119.

Figure 3:
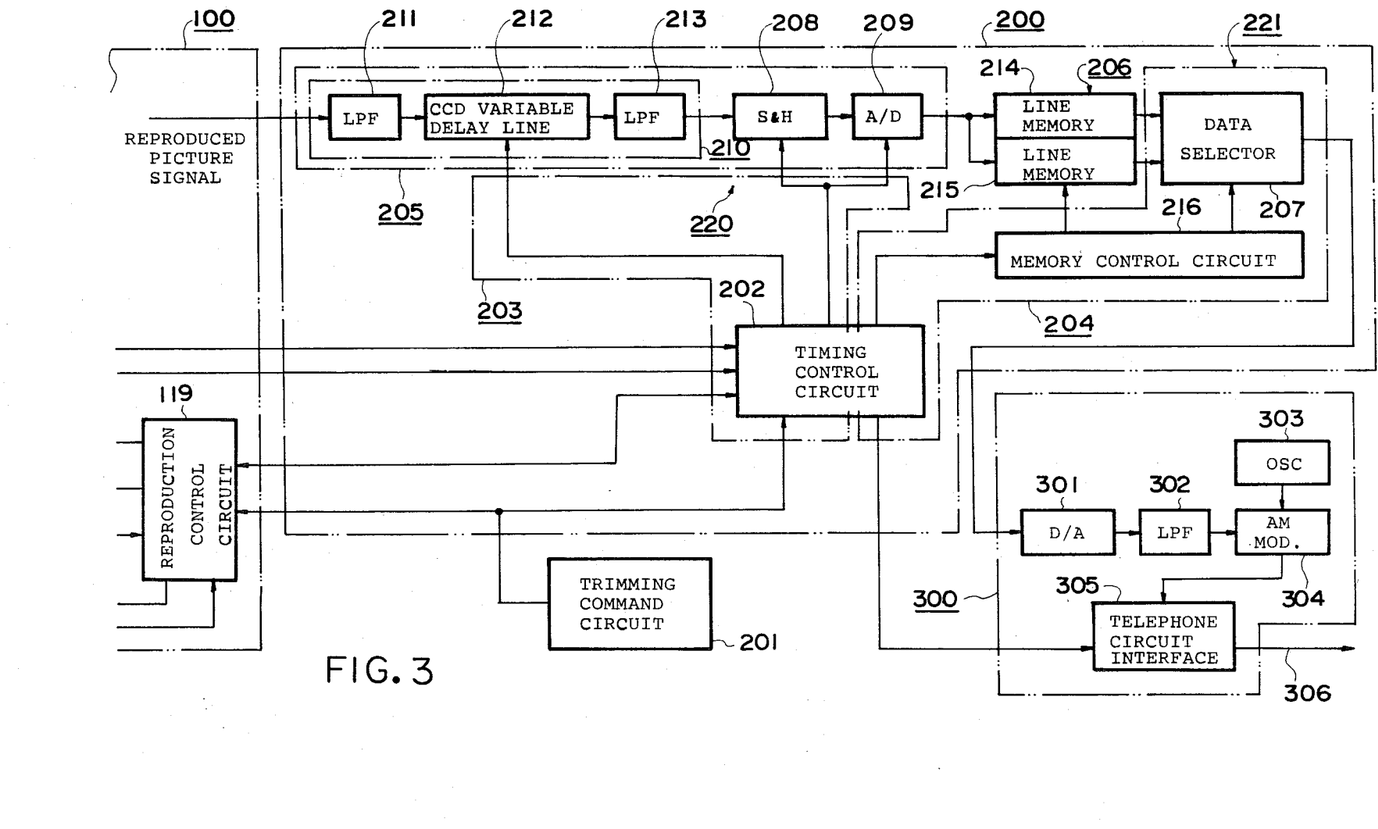
FIG. 3 is a block diagram showing the construction of an embodiment of a signal conversion section forming a principal part of the invention.

The signal conversion section 200 constitutes a principal part of the invention and its first embodiment is shown in FIG. 3.

In the FIG. 3, the signal conversion section 200 comprises mainly a horizontal trimming circuit 220 including a sample and hold circuit 208 and an A/D converter 209, and a vertical trimming circuit 221 including a plurality of temporary memory circuits 206 represented as line memories 214 and 215, a data selector circuit 207, etc. The facsimile timing control circuit 202 is included in the signal conversion section 200 as mentioned previously and the facsimile timing control circuit 202 is responsive to the trimming coordinate data and size data designated by the cursor movements to determine the effective limits between certain positions of the horizontal scan lines and the effective limits between certain lines in the vertical direction. The timing control circuit 202 comprises horizontal trimming control means 203 with respect to the horizontal scanning so as to vary the sampling frequency and horizontal sampling positions of the sample and hold circuit 208 and vertical trimming control means 204 with respect to the vertical direction so as to perform the interpolation calculation as will be described later in detail. These means will be described later in detail.

The signal conversion section 200 further comprises a sampling circuit 205 and its sampled output is applied to the facsimile output section 300 through the temporary memory circuits 206 and the data selector circuit 207.

The sampling circuit 205 comprises the sample and hold circuit 208 and the A/D converter 209 for sampling the reproduced picture signal from the reproduced signal processing circuit 109 and generating the same as a digital output as mentioned previously. In the embodiment of FIG. 3 the sampling circuit 205 further comprises at its input a delay circuit 210 comprising a low-pass filter 211, a CCD variable delay line 212 and another low-pass filter 213.

In the embodiment of FIG. 3, the temporary memory circuits 206 comprise the first and second line memories 214 and 215 and the writing and reading of these memory circuits are performed by a memory control circuit 216 in response to the timing signals from the facsimile timing control circuit 202.

The data selection circuit 207 reads the stored contents of the line memories 214 and 215 for every horizontal scan line at the desired rate and it forms a part of the vertical trimming control means as the facsimile timing control circuit 202 and the memory control circuit 216 as will be described later.

Next, the operation of the embodiment will be described. The output of the reproduced signal processing circuit 109 is applied to the monitor display interface circuit 117 and also to the CCD variable delay line 212 of the signal conversion section 200 through the low-pass filter 211. The CCD variable delay line 212 samples the analog picture signal at a frequency $f_s$ which is at least two times and usually three to four times the maximum frequency in the frequency band thereof and it has a capacity of storing the data for one horizontal scan line. The low-pass filters 211 and 212, respectively arranged before and after the delay line 212, are provided to prevent any folded distortion in the sampling or to eliminate any switching noise. The writing operation of the CCD delay line 212 is effected at the same frequency $f_s$ and the reading operation is effected at a frequency which is sufficiently lower than the frequency $f_s$. Thus, the picture signal for one horizontal scan line is expanded in time by the preceding delay line 212 and then delivered from its low-pass filter 213. This conversion to the lower frequency is advantageous in that the frequency handled in the folowing sample and hold circuit 208 and A/D converter 209 can be decreased.

The picture signal thus expanded to the lower frequency band is sampled and quantized by the sample and hold circuit 208 and the A/D converter 209 and then stored as a digital signal for one horizontal scan line in the line memories 214 and 215 in an alternate manner. With the line memories 214 and 215 each having a storage capacity for one horizontal scan line, when one of them is in the write mode, the other is in the read mode and they are controlled by the memory control circuit 216 such that they change their roles every horizontal scan line. The data selection circuit 207 is responsive to the selection signal from the memory control circuit 216 to operate such that the output is always delivered at a given timing from either one of the line memories 214 and 215 which is in the read mode.

The digital video signal generated from the data selection circuit 207 is again converted to an analog signal by a D/A converter 301 of the transmission output section 300, passed through a low-pass filter 302, amplitude modulated by an AM modulator 304 with the output carrier wave from a carrier oscillator 303, combined with the synchronizing signals in a telephone circuit interface circuit 305 and delivered onto a telephone circuit 306.

As mentioned previously, the data of a given scan line of the picture is applied to the input of the CCD variable delay line 212 at the rate of one per revolution of the magnetic sheet 101. Thus, if the sheet speed is 1,800 rpm, the picture signal corresponding to any given scan line can be extracted and applied to the CCD variable delay line 212 at the rate of one per 1/30 second and this timing is controlled by the facsimile timing control circuit 202.

Considering that the band of the telphone circuit is generally on the order of 3.4 kHz and that the drum speed of the existing facsimile transmission system is in the range of 100 to 200 rpm or the time required per scan line is about ⅓ to 1/1.5 second, it will be seen that the scan line extraction rate of one per 1/30 second represents a satisfactory speed. The trimming operation will now be described as follows.

As mentioned previously, the trimming positions are controlled by the trimming command circuit 201 through the movement of the cursors on the screen of the monitor 118 and the data of four positions, i.e., left and right horizontal positions, and upper and lower vertical positions are applied to the facsimile timing control circuit 202.

Figure 4:
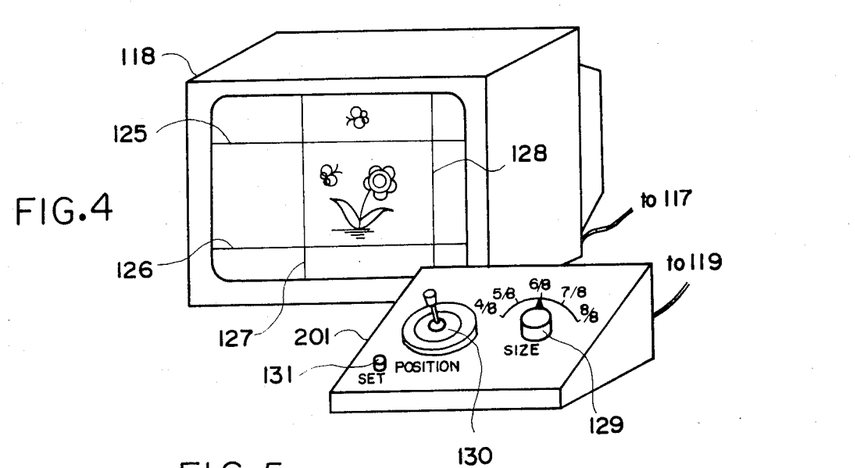
FIG. 4 shows the external appearance of a monitor CRT and trimming command means.

This condition is shown in FIG. 4. As shown in FIG. 4, the portion enclosed by the two horizontal cursors and the two vertical cursors superimposed and displayed on the picture on the CRT screen is the area which will be made valid as a result of the trimming. The spacing between the horizontal cursors 125 and 126 and the spacing between the vertical cursors 127 and 128 are determined by commanding the reduction ratio of the trimming frame to the whole picture by a selector swtich 129 on the panel of the trimming command circuit 201.

The position of the trimming frame can be changed as desired on the screen by a joy stick 130.

After the size and position of the trimming frame are thus established, a set switch 131 on the panel is depressed so that the trimming conditions or the data of the trimming frame position coordinates and size are respectively read in the form, for example, of a binary data code of 19 to 20 bits for the former and a binary data code of 3 to 4 bits for the latter into the reproduction control circuit 119 and the data are also transmitted to the signal conversion section 200.

The trimming in the horizontal direction will be described first. The horizontal trimming is determined in accordance with the A/D conversion sampling repetition frequency of the sample and hold circuit 208 and the A/D converter 209 and the determination of the sampling limits of the signal generated from the CCD variable delay line 212.

Figure 5:
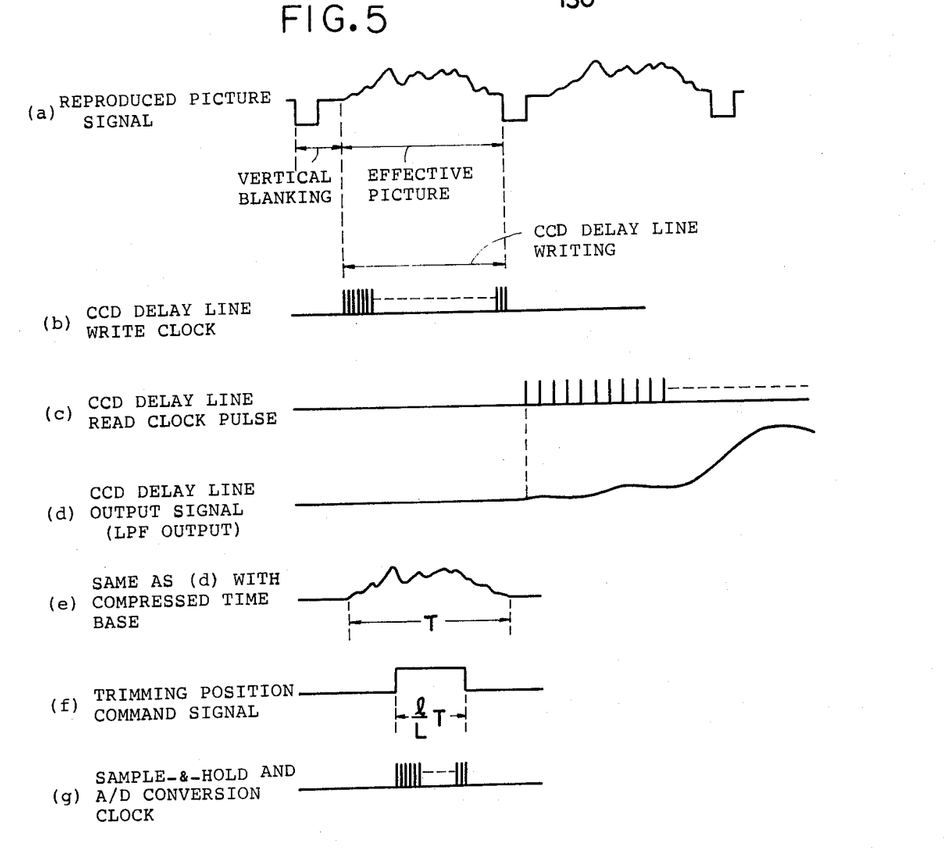
FIG. 5 is a graphic representation of the waveforms and timing of signals generated at various parts of FIG. 3 and useful for explaining the operation of horizontal trimming.

FIG. 5 shows the principal signals involved in the horizontal trimming and their timing relations and shown in (a) is the reproduced picture signal or the output of the low-pass filter 211. This reproduced picture signal is the one reproduced from the magnetic sheet 101 and it contains the wide frequency band components. The effective picture area of the reproduced picture signal is written into the CCD variable delay line 212 in response to the clocks (b) of a frequency which is at least over two times the frequency of the signal (a). This writing operation is performed at intervals of a time period determined by the timing of the vertical interpolation which will be described later. The picture signal thus written into the CCD variable delay line 212 is read out in response to the low-frequency clock pulses (c) suited to the low-speed A/D converter 209 so that the signal is converted to a digitized picture signal through the sample and hold circuit 208 and the A/D converter 209 and supplied to one of the line memories 214 and 215 which is not in the read mode.

The signal thus read from the CCD variable delay line 212 and passed through the low-pass filter 213 is shown in (d) and (e) of FIG. 5. In the FIG. 5, the time base (abscissa) of (a) to (d) is different in scale from that of (e) to (g) for purposes of description and therefore (d) and (e) show the same signal.

The horizontal trimming of the output signal from the CCD variable delay line 212 and the low-pass filter 213 is accomplished by controlling the A/D conversion sampling frequency and the timing of starting and terminating the sampling. In other words, the facsimile timing control circuit 202 generates a trimming position command signal (f) in response to the output of the trimming position command circuit 201 and in accordance with its horizontal trimming position data. In response to the generation of the signal (f), the clock pulses, whose frequency is controlled in accordance with the time width of the signal (f) or the trimming limits, are passed by the signal (f) and in this way the required clock signals (g) to be applied to the sample and hold circuit 208 and the A/D converter 209 are generated, thereby accomplishing the horizontal trimming. More specifically, if the length between the horizontal trimming start coordinates (the right end) and end coordinates (the left end) in the picture is known, the operating frequency and operating timing of the sample and hold circuit 208 and the A/D converter 209 are established in accordance with the length such that a given number of sampling points (e.g., 900 points) fall within the length and the generation of the clocks (g) varying in frequency with the horizontal trimming effective length can be easily accomplished by means of a PLL (Phase Locked Loop) circuit, for example. For instance, if L represents the horizontal total effective length of the picture, l represents the horizontal effective length after the trimming, T represents the single-line read time of the CCD variable delay line 212 and N represents the number of picture elements stored in the line memory 214 or 215 (N=900 in this embodiment), the sampling interval is given by $1/N (T \cdot l / L)$ and the sampling frequency is given by its reciprocal or $NL/Tl$. Assuming that the trimming is one half ($l/L = \frac{1}{2}$), N=900 points and T=9 m sec, then the sampling frequency becomes 200 kHz.

Next, the trimming in the vertical direction will be described. The simplest method of vertical trimming is to fixedly determine the trimming ratio as an integral fraction, e.g., ½, ⅓ or ¼ and select the ratio. In this case, the deficient horizontal scan lines determined by the selected trimming ratio are compensated for by interpolation. The ordinary interpolation method can be effected by adding a weighted addition between the adjacent scan lines to the data selection by the data selection circuit 207. Of course, in this case the selection of the reading start scan line and end scan line is performed by the memory control circuit 216 in accordance with the command data supplied from the timing control circuit 202 in response to the trimming command circuit 201 as mentioned previously.

Now assuming the condition where the scan line signal written into the line memory 214 is being read out, this reading is sufficiently slow compared with the time required for taking a given scan line data from the CCD variable delay line 212, subjecting the same to A/D conversion and writing the same into the other line memory 215 as mentioned previously, and therefore it is possible to prepare in the line memory 215 the scan line data for the next pair which is necessary for providing any interpolation scan lines before the completion of the reading from the line memory 214. After the completion of the reading, the data selection circuit 207 calculates and generates the interpolation scan lines. In this case, no new scan line data is written into the two line memories until the generation of the desired number of the interpolation scan lines is completed and the weighted sum values of the corresponding sampling point values of the two scan lines are generated as interpolation scan line signals. Assuming that A represents the value of given one of the sampling points in the line memory 214 and B represents the value of the corresponding sampling point in the line memory 215, the interpolation of three scan lines can be accomplished by providing a first interpolation scan line signal in terms of $\frac{1}{4}(3A+B)$, a second interpolation scan line signal in terms of $\frac{1}{4}(2A+2B)$ and a third interpolated scan line signal in terms of $\frac{1}{4}(A+3B)$, and the interpolation of two scan lines can be accomplished by providing similarly a first interpolation scan line signal in terms of $\frac{1}{3}(2A+B)$ and a second interpolation scan line signal in terms of $\frac{1}{3}(A+2B)$. This weighted addition operation can be accomplished by means of hardware or by means of a microcomputer since the reading can be effected at as low a speed as about 2 kHz.

After the completion of the interpolation scanning, the scan line signal in the line memory 215 is outputted as such with a weight of 1 and at this time a new scan line signal to be paired with the scan line signal in the line memory 215 for the next interpolation is written into the line memory 214.

Thereafter, the above-mentioned operation is repeated until the required number of scan lines, e.g., 600 lines, are produced, thereby delivering the data corresponding to the 600×900 picture elements of the cabinet photography.

Figure 6:
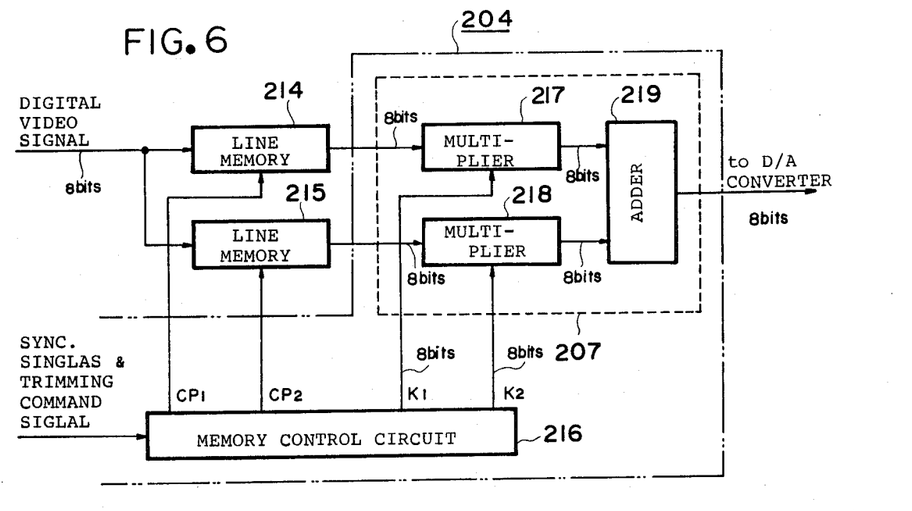
FIG. 6 is a block diagram showing in detail the construction of the temporary memory circuits and the data selection circuit of FIG. 3 which are useful for explaining the operation of vertical trimming.

FIG. 6 is a block diagram of the principal part including the scan line interpolation function useful for explaining the vertical trimming operation in greater detail and in this embodiment the data selection circuit 207 comprises digital multipliers 217 and 218 of 8-bit×8-bit and an adder 219 of 8-bit+8-bit.

The operation of interpolating two scan lines or trimming to $\frac{1}{3}$ in the vertical direction will now be described. Assume that the scan line data to be delivered was stored in the line memory 214 in the manner described in connection with FIG. 5 and it is now being read and delivered. The time required for delivering this particular scan line is considerably longer than the time required for reproducing a given single scan line data from the magnetic sheet and thus the next scan line data can be read and stored in the line memory 215 while the line memory 214 is being read. In this case, two scan lines are interpolated before the data is read from the line memory 215 and they are referred to as first and second interpolation scan lines. Due to its spatial distance, the first interpolation scan line should preferably be made closer to the value of the line memory 214 rather than the value of the line memory 215.

Thus, it is necessary to obtain the value $D_1$ of the first interpolation scan line from the following equation upon completion of the reading of the line memory 214.

$$D_1 = (K_1 \cdot D_1 + K_2 \cdot D_2)/2^8$$

Here, $D_1$ and $D_2$ represent the values of the corresponding horizontal positions in the line memories 214 and 215, respectively, and the values are each 8 bits long in this embodiment. Thus, it becomes $K_1+K_2=2^8$ in the range of 0 to 255 ($=2^8-1$) for each of the coefficients $K_1$ and $K_2$. Since the number of interpolation scan lines is 2, it is only necessary to select the values of $K_1$ and $K_2$ such that $K_1/2^8 \simeq \frac{2}{3}$ and $K_2/2^8 \simeq \frac{1}{3}$ for the first interpolation scan line and $K_1/2^8 \simeq \frac{1}{3}$ and $K_2/2^8 \simeq \frac{2}{3}$ for the second interpolation scan line. In this way, with $K_1=2^8$ and $K_2=0$ (practically there will be no problem with $K_1=2^8-1$ and $K_2=1$), the stored contents of the line memory 214 are first read out through the multipliers 217 and 218 and the adder 219. Then, with $K_1/2^8 \simeq \frac{2}{3}$ and $K_2/2^8 \simeq \frac{1}{3}$, the operation of weighted interpolation between the stored contents of the line memories 214 and 215 is performed through the multipliers 217 and 218 and the adder 219, thereby delivering the first interpolation scan line data. Then the second interpolation scan line data is delivered similarly by the interpolation operation according to $K_1/2^8 = \simeq \frac{1}{3}$ and $K_2/2^8 \simeq \frac{2}{3}$. When all is over, it is set so that $K_1=0$ and $K_2=2^8$ (practically there will be no problem if $K_1=1$ and $K_2=2^8-1$) and the stored contents of the line memory 215 are read out as such. During the reading of the line memory 215, a further scan line data is reproduced and stored in preparation for the next interpolation.

By thus writing the reproduced data into the line memories 214 and 215 alternately, and simultaneously reading the data from the two memories during the interpolation but reading the data from only one of the memories in another condition, thereby performing the necessary interpolation operations with the successively varying weights, it is possible to effect the vertical trimming without any deterioration of the picture quality.

Figure 7:
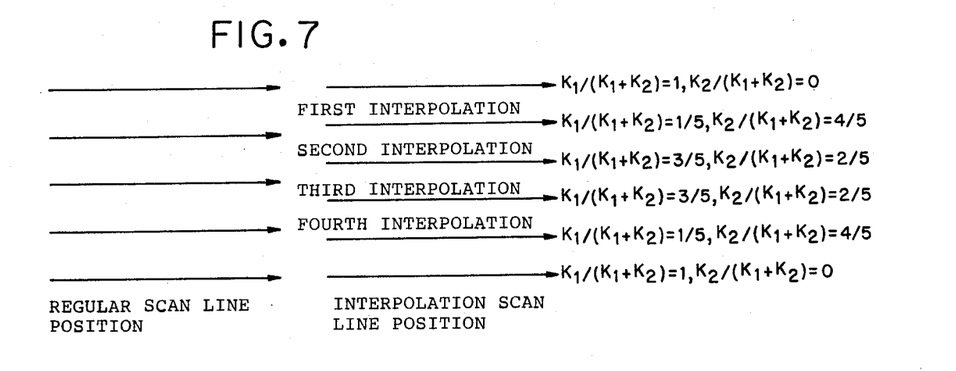
FIG. 7 is a schematic diagram showing the manner in which the scan line interpolation is effected in the vertical trimming operation of FIG. 6.

While, in the foregoing description, the vertical trimming to an integral fraction such as $\frac{1}{2}, \frac{1}{3}, \ldots 1/n$ is effected, it is easy to effect the trimming to any intermediary size such as m/n. FIG. 7 shows the vertical trimming method used in the case where m=4 and n=5. In the case of FIG. 7, an output for five scan lines is derived from the reproduced video signal for four scan lines and it is possible to produce a smooth picture by selecting the coefficients $K_1$ and $K_2$ for the first to fourth interpolation scan lines as shown in FIG. 7. In the case of FIG. 7, however, it is assumed that the first scan line is stored in the line memory 214 and the interpolation is continued as such thereby returning to the initial condition ($K_1=2^8$, $K_2=0$) at the fifth line or the regular scan line. In this case, an additional third line memory is required compared with the case of FIG. 6 and the third line memory is used for the fifth line in place of the line memory 214, thereby performing the operations alternately.

Figure 8:
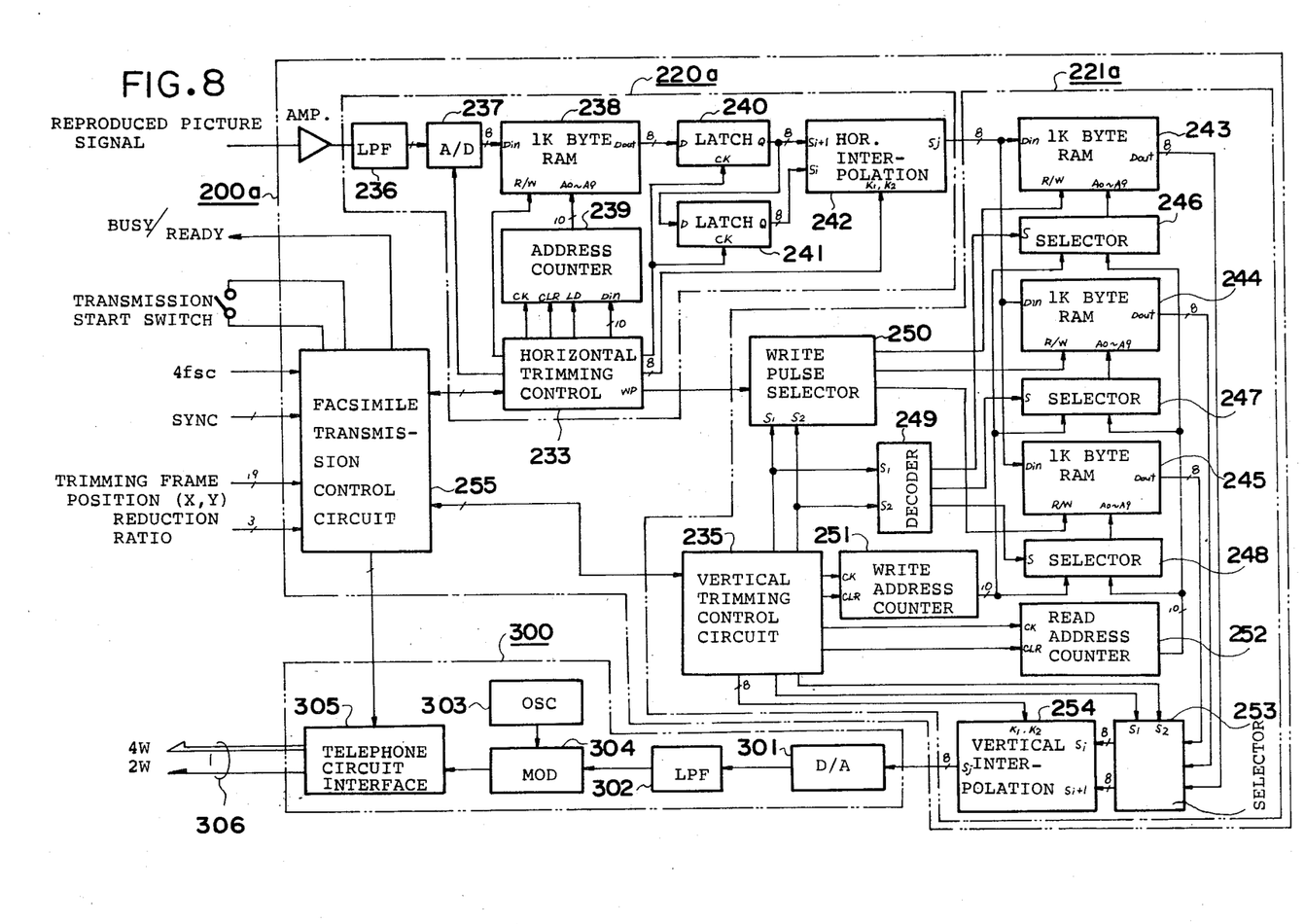
FIG. 8 is a block diagram showing the construction of another embodiment of the signal conversion section.

Referring now to FIG. 8, a signal conversion section 200a according to a second embodiment of the invention will be described. This second embodiment signal conversion section 200a comprises, for the horizontal scanning, a horizontal trimming circuit 220a including an A/D converter 237 for sampling and digitization purposes, a random-access memory or RAM 238 as the memory device for one horizontal scan line, a horizontal interpolation circuit 242, a horizontal trimming control circuit 233 for controlling the operation of the former circuits, etc., for the vertical trimming, a vertical trimming circuit 221a including RAMs 243, 244 and 245 as the memory circuits for processing the signals after horizontal interpolation, a vertical trimming control circuit 235 for controlling the operation of the former circuits, etc., and a facsimile timing control circuit 255 for controlling the trimming in both the horizontal and vertical directions and the timing of facsimile transmission.

In FIG. 8, those elements designated by the same numerals as used in FIGS. 2 and 3 are equivalent in function to their counterparts and will not be described in any detail for purposes of preventing redundancy.

The operation of the second embodiment will now be described. In FIG. 8, the reproduced picture signal supplied to the signal conversion section 200a is successively read, starting at the top of the horizontal scan lines within the trimming frame commanded by the trimming command circuit 201 of FIG. 2, into the horizontal trimming circuit 220a in accordance with the control of the reproduction control circuit 119 of FIG. 2 as mentioned previously. In this case, the writing is effected in such a manner that the signal is first converted to digital data and then written into the 1-kilobyte RAM 238 in accordance with the control of a horizontal trimming control circuit 233.

An address counter 239 for applying an address to the RAM 238 is cleared by the control circuit 233 just before the writing of the RAM 238 and thereafter its count is increased by 1 each time the A/D conversion is effected.

Assuming that the input reproduced picture signal is a monochrome signal according to the NTSC system, it is advantageous to use as the A/D conversion frequency a frequency of about four times (4 $f_{sc}$) of the sub-carrier frequency. In the A/D conversion, every horizontal scanning period is sampled at 910 points with 8 bits per picture element, thereby generating a digitized video signal. After the digitized picture signal has been written into the RAM 238, the horizontal trimming operation according to the horizontal interpolation is initiated immediately.

At that time, the horizontal address of the left end of the horizontal trimming frame is first loaded into the address counter 239 and thus the RAM 238 is operated in the read mode.

A latch 240 connected to the RAM 238 is connected in series with another latch 241 and the outputs of these latches are both applied to the horizontal interpolation circuit 242.

With this construction, the clocks are applied successively to the address counter 239 so that the data is successively read from the RAM 239 and is transferred to the latch 241 from the latch 240.

Thus, in response to the clock pulses from the horizontal trimming control circuit 233 the latches 240 and 241 always generate simultaneously as their outputs the data of the two picture elements adjoining in the horizontal direction in the same horizontal scan line, thereby allowing the production of a plurality of new interpolation data from these two data.

Figure 11:
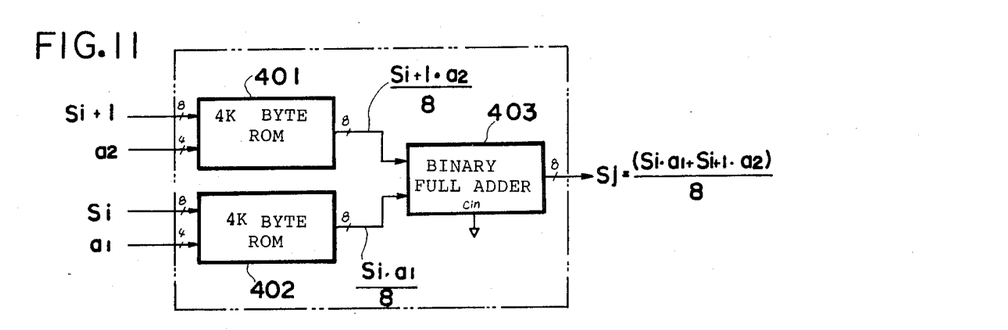
FIG. 11 is a block diagram showing an exemplary construction of the horizontal interpolation circuit in the embodiment of FIG. 8.

As shown in detail by way of example in FIG. 11, the interpolation circuit 242 comprises two 4-kilobyte ROMs 401 and 402 and a binary full adder 403. Each of the ROMs 401 and 402 has a 12-bit address terminal and its output comprises 8 bits. Of the 12 bits of the input, the first 8 bits consist of the output $S_i+1$ or $S_i$ from the latch 240 or 241 and the remaining 4 bits consist of a weighting factor $a_2$ or $a_1$ used in the interpolation calculation. Each ROM is programmed so that its output consists of the higher 8 bits of the product $S_i+1-a^2$ or $S_i-a_1$ and thus it functions as a look-up table.

Assuming now that the successive two picture element data read from the 1-kilobyte RAM 238 are represented as Si and $S_i+1$, respectively, and their associated weighting factors are represented as $a_1$ and $a_2$, respectively, the picture element data $S_j$ resulting from the interpolation (the linear interpotation) is given by the following equation with the weighting factors $a_1$ and $a_2$ being positive integers in the range of 0 to 8.

$$S_j = (S_i \cdot a_1 + S_{i+1} \cdot a_2)/8$$

The resulting $S_j$ is generated from the horizontal interpolation circuit 242.

This process will now be described in greater detail with reference to FIGS. 9 and 10. Here, the reduction ratios of the trimming frame are limited to five ratios of 100% (8/8) to 50% (4/8).

Figure 9:
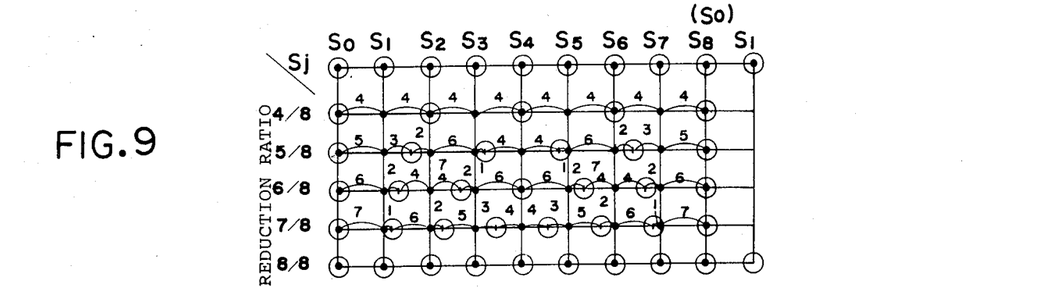
FIG. 9 is a schematic diagram showing the manner in which the horizontal interpolation is effected according to the construction of FIG. 8.

FIG. 9 shows the relative positional relation between the original data and the interpolation data and eight picture elements are produced from the seven picture elements of the original data if the reduction ratio is $\frac{7}{8}$, for example. The marks of 0 indicated by the sides of the reduction ratios show the picture element positions of the original data and those shown at the top indicate the picture element positions provided by the interpolation. In the FIG. 9, the numerals 1 to 7 indicate the relative horizontal distances of the original picture elements and the interpolation picture elements and the distance between the original picture elements is always selected to equal 8.

For instance, if the reduction ratio is $\frac{5}{8}$, the weighting factors $a_1=3$ and $a_2=5$ correspond to the interpolation picture element given by $S_j=S_1$. And there results $a_1+a_2=8$ in all cases.

Figure 10:
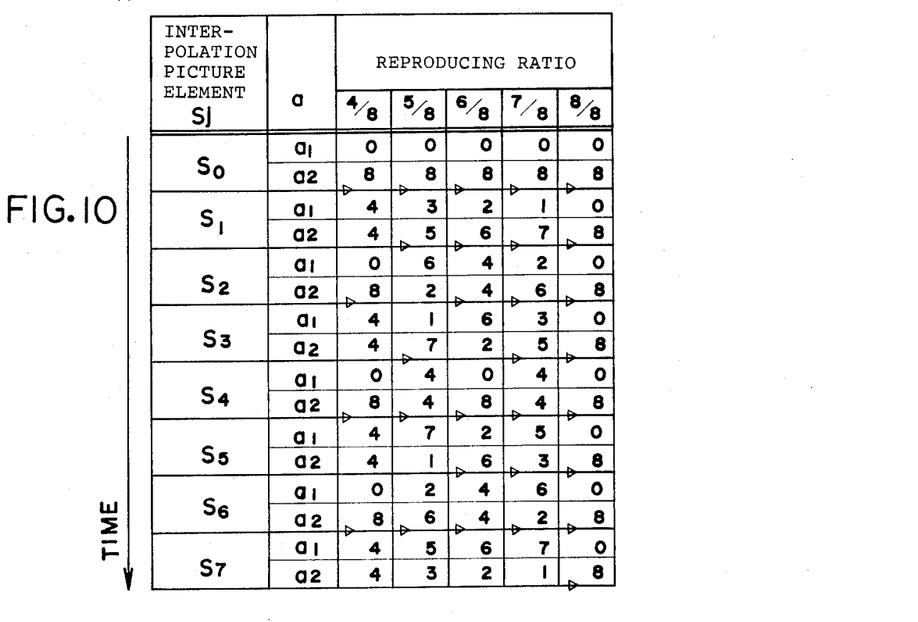
FIG. 10 is a schematic diagram showing the manner of linear interpolation and the timing of data renewal.

FIG. 10 shows the manner in which the interpolation picture elements corresponding to the respective reduction ratios are calculated with the weighting factors $a_1$ and $a_2$ of varying values and the table of FIG. 10 may be considered as indicating the states of the interpolation operation if the time base is taken in the downward direction. For instance, with the reduction ratio of $\frac{5}{8}$, from the column of $S_j=S_1$ in FIG. 10 it will be seen that $a_1=3$ and $a_2=5$. Also in the FIG. 10, those indicated by the triangular marks each denotes that upon completion of the calculation of the upper column the count of the address counter 239 is increased and a new data is read into the latch 240 from the RAM 238 while transferring the data previously stored in the latch 240 to the latch 241.

In other words, if there is no triangular mark, even if the calculation of any given column is completed, the original data is not renewed and the calculation of the next column is performed.

After the column of $S_j=S_7$, the operation is returned to the column of $S_j=S_o$ at the top of the table and this process is repeated.

The above-mentioned horizontal interpolation operation is completed when the number of the picture elements produced by the interpolation becomes equal to a predetermined number, e.g., the number of samplings of one horizontal scanning of the original data.

The interpolation data produced by the horizontal interpolation is written into one of the 1-kilobyte RAMs 243, 244 and 245 included in the vertical trimming circuit 221a. Of the three RAMs 243, 244 and 245, two are always operated in the read mode and the remaining one is always operated in the write mode and the horizontal interpolation data is written into the RAM which is in the write mode.

The RAMs 243, 244 and 245 are respectively provided with address selectors 246, 247 and 248 so that the output of a write address counter 251 is selected and applied to the RAM in the write mode and the output of a read address counter 252 is selected and applied to the RAMs in the read mode.

A write pulse selector 250 selects the write pulse WP generated from the horizontal trimming control circuit 233 in synchronism with the horizontal interpolation operation and applies the same to the RAM in the write mode. The vertical trimming control circuit 235 applies 2-bit memory selection signals to the write pulse selector 250 and a decoder 249 which provides the selection signals of the address selectors 246, 247 and 248.

A selector 253 selects the two RAMs which are in the read mode and the outputs of the selected RAMs are supplied simultaneously to a vertical interpolation circuit 254.

As a result, the data of two picture elements which are at the corresponding horizontal positions in the vertically adjoining two horizontal scan lines are always applied simultaneously to the vertical interpolation circuit 254 and thus any linear interpolations of these two scan lines can be calculated in the same manner as in the case of the horizontal interpolation operation.

The vertical interpolation circuit 254 is identical in construction with the horizontal interpolation circuit 242 and its exemplary circuit is the same as that shown in FIG. 11.

The facsimile timing control circuit 255 receives from the reproducing section 100 of FIG. 2 the sampling clocks 4 $f_{sc}$ used for A/D conversion, various synchronizing signals and trimming data and it supplies to the reproducing section 100 a BUSY/READY signal indicative of whether the facsimile transmission is on or off. Also, the control circuit 255 derives the desired scan line signals from the repeatedly reproduced video signals and also supplies the required control signals for the horizontal and vertical interpolation operations to the horizontal trimming control circuit 233 and the vertical trimming control circuit 235, respectively.

The facsimile timing control circuit 255 also generates the timing signal required when the interpolation signal from the signal conversion section 200a is received by the facsimile section 300 and transmitted through the telephone circuit.

While, in the above-described two embodiments, the invention is applied to the system which handles the monochrome video signal, it is evident, without need to examine the existing TV and VTR techniques, that the invention can be applied easily to the conversion of color pictures. For instance, the solid-state area imaging device 5 in the form of a single plate can be adapted for color pictures and it is also possible to multiplex a chrominance signal and a luminance signal and generate a color video signal in terms of 1, 2 or 3 lines.

Further, in the embodiment of FIG. 8 the sampling clock frequency of the A/D converter 237 can be varied and controlled to compensate for the jitter in a video signal which presents difficulty when producing a hard copy.

The present invention is as above described so that in contrast to the conventional facsimile transmission which uses a silver salt film and which requires the developing and printing operations at the sending side, an electronic still camera requiring no such operations is used and its picture information is transmitted as such or after the necessary trimming over the public telephone circuit thereby converting the picture information into a hard copy at the receiving end. Thus, in the future the present invention can be easily adapted to a digital facsimile transmission and further not only the invention can be expected to be developed into a color facsimile transmission but also the invention can be used in various applications such as converting a still picture high-velocity signal to a low-velocity signal with the desired trimming as needed and applying the same to a hard copying apparatus.

What is claimed is:

1. A still picture signal conversion apparatus comprising:
   a horizontal trimming circuit whereby a still picture signal reproduced from a recording medium or a magnetic disk is sampled every horizontal scan line and the sampled picture signal, within limits of horizontal scan positions to be retained as a result of a trimming, is converted to a digitized picture signal corresponding to a predetermined number of horizontal picture elements and outputting such a digitized picture signal every horizontal scan line; and
   a vertical trimming circuit whereby said digitized picture signal generated every horizontal scan line fron said horizontal trimming circuit is temporarily stored in a plurality of memory means such that while reading out at a desired rate said picture signal of said stored contents within limits of vertical positions to be retained as a result of a trimming, a deficiency of horizontal scan lines within said limits of vertical positions with respect to a predetermined number of horizontal lines is interpolated by a weighted scan line interpolation calculation corresponding to the ratio of said trimming, wherein said horizontal trimming circuit comprises:
   sampling means having a variable sampling frequency for sampling and digitizing said reproduced still picture signal every horizontal scan line; and
   horizontal trimming control means whereby in accordance with said limits of horizontal scan positions to be retained by trimming said sampling frequency is controlled and varied such that the positions of sampling starting and ending points of said sampling means are varied and the number of sampling points in the interval between said starting and ending points is made equal to a predetermined number.

2. An apparatus according to claim 1, wherein said sampling means includes at the input thereof a delay circuit for expanding said still picture signal in time and converting the same to a low-velocity narrow-band picture signal.

3. An apparatus according to claim 2, wherein said delay circuit includes a CCD.

4. An apparatus according to claim 1, wherein said sampling means includes a sample and hold circuit and an analog-to-digital converter.

5. A still picture signal conversion apparatus comprising:
- a horizontal trimming circuit whereby a still picture signal reproduced from a recording medium or a magnetic disk is sampled every horizontal scan line and the sampled picture signal, within limits of horizontal scan positions to be retained as a result of a trimming, is converted to a digitized picture signal corresponding to a predetermined number of horizontal picture elements and outputting such a digitized picture signal every horizontal scan line; and
- a vertical trimming circuit whereby said digitized picture signal generated every horizontal scan line from said horizontal trimming circuit is temporarily stored in a plurality of memory means such that while reading out at a desired rate said picture signal of the stored contents within limits of vertical positions to be retained as a result of a trimming, a deficiency of horizontal scan lines within said limits of vertical positions with respect to a predetermined number of horizontal lines is interpolated by a weighted scan line interpolation calculation corresponding to the ratio of said trimming, wherein said horizontal trimming circuit comprises:
- sampling means for sampling said still picture signal every horizontal scan line thereof and generating digital data representing a predetermined number of sampling points of said still picture signal;
- a memory device for storing said digital data every horizontal scan line;
- horizontal interpolating means, including a plurality of cascade connected latch circuits, capable of weighted interpolation whereby in accordance with horizontal scan positions to be trimmed the digital data representing a desired number of sampling points of said still picture signal is read from said memory device and the number of sampling points during said reading time is made equal to a predetermined number; and
- horizontal trimming control means for controlling the operation of said sampling means, said memory device and said horizontal interpolating means.

6. An apparatus according to claim 5, wherein said vertical trimming circuit comprises:
- a plurality of memory circuits for temporarily storing said digitized picture signal generated every horizontal scan line from said horizontal trimming circuit;
- data selection means whereby the stored content picture signal of selected two of said memory circuits are read out simultaneously at a desired rate and the points of starting and ending said reading of said selected memory circuits are varied in accordance with said vertical positions to be trimmed;
- vertical interpolating means whereby a deficiency of horizontal scan lines within the limits of said vertical positions is interpolated by a weighted scan line interpolation calculation to increase the same to a predetermined number of scan lines; and
- vertical trimming control means for controlling the operation of said memory circuits, said data selection means and said vertical interpolating means.

7. A still picture signal conversion apparatus comprising:
- horizontal trimming means for sampling a still picture reproduced from a medium every horizontal scan line and converting the sampled picture signal, within limits of horizontal scan positions to be retained as a result of a trimming, to a digitized picture signal corresponding to a predetermined number of horizontal picture elements, and outputting such a digitized picture signal every horizontal scan line; and
- vertical trimming means having a plurality of memory means, said vertical trimming means temporarily storing said digitized picture signal generated every horizontal scan line in said plurality of memory means such that while reading out said picture signal of the stored contents at a desired rate, within limits of vertical positions to be retained as a result of a trimming, a deficiency of horizontal scan lines within said limits of vertical positions with respect to a predetermined number of horizontal lines is interpolated by a weighted scan line interpolation calculation corresponding to the ratio of said trimming, wherein said horizontal trimming means comprises:
- sampling means having a variable sampling frequency for sampling and digitizing said reporduced still picture signal every hoirzontal scan line; and
- horizontal trimming control means whereby in accordance with said limits of horizontal scan positions to be retained by trimming, said sampling frequency is controlled and varied such that the positions of sampling starting and ending points of said sampling means are varied and the number of sampling points in the interval between said starting and ending points is made equal to a predetermined number.

8. An apparatus according to claim 7, wherein said sampling means includes at the imput thereof a delay circuit for expanding said still picture signal in time and converting the same to a low-velocity narrow-band picture signal.

9. An apparatus according to claim 8, wherein said delay circuit includes a CCD.

10. An apparatus according to claim 7, wherein said sampling means includes a sample-and-hold circuit and analog-to-digital converter.

11. A still picture signal conversion apparatus comprising:
- horizontal trimming means for sampling a still picture reproduced from a medium every horizontal scan line and converting the sampled picture signal to a digitized picture signal corresponding to a predetermined number of horizontal picture elements, and outputting such a digitized picture signal every horizontal scan line; and
- vertical trimming means having a plurality of memory means, said vertical trimming means temporarily storing said digitized picture signal generated every horizontal scan line in said plurality of memory means such that while reading out said picture signal of the stored contents at a desired rate, within limits of vertical positions to be retained as a result of a trimming, a deficiency of horizontal scan lines within said limits of vertical positions with respect to a predetermined number of horizontal lines is interpolated by a weighted scan line interpolation calculation corresponding to the ratio of said trimming, wherein said horizontal trimming means comprises:
- sampling means for sampling said still picture signal every horizontal scan line thereof and generating digital data representing a predetermined number of sampling points of said still picture signal;

a memory device for storing said digital data every horizontal scan line;

horizontal interpolating means, including a plurality of cascade-connected latch circuits, capable of weighted interpolation whereby in accordance with horizontal scan positions to be trimmed, the digital data representing a desired number of sampling points of said still picture signal is read from said memory device and said read digital data is interpolated so that the number of said interpolated digital data is made equal ot said predetermined number; and horizontal trimming control means for controlling the operation of said sampling means, said memory device and said horizontal interpolating means.

12. An apparatus according to claim 11, wherein said vertical trimming circuit comprises:

data selection means whereby the stored content picture signal of a selected pair of said plurality of memory means are read out simultaneously at said desired rate and the points of starting and ending said reading of said selected memory means are varied in accordance with said vertical positions to be trimmed;

vertical interpolating means whereby a deficiency of horizontal scan lines within the limits of said vertical positions is interpolated by a weighted scan line interpolation calculation to increase the number of horizontal lines to said predetermined number; and vertical trimming control means for controlling the operation of said plurality of memory means, said data selection means and said vertical interpolating means.

* * * * *